March 24, 1925.
J. CONDE
1,530,884
MACHINE FOR MAKING BOTTLES OR VIALS
Filed Aug. 29, 1921    4 Sheets-Sheet 1
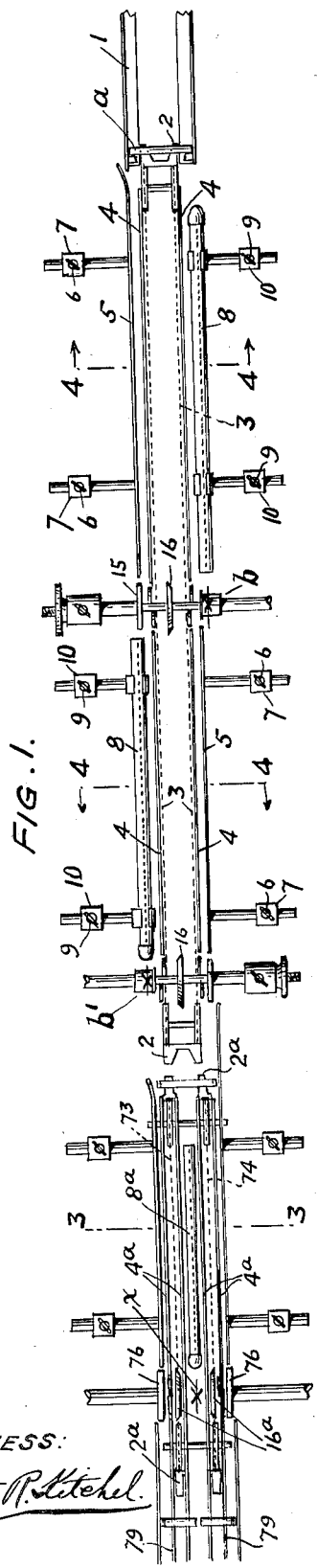
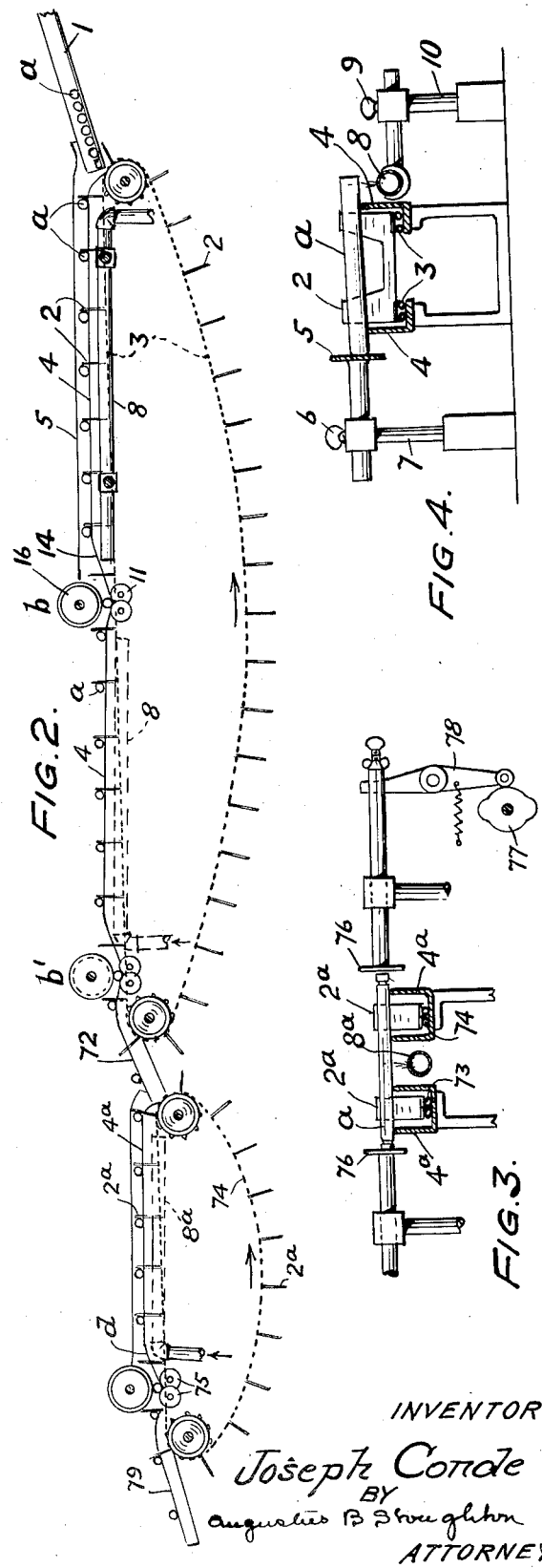
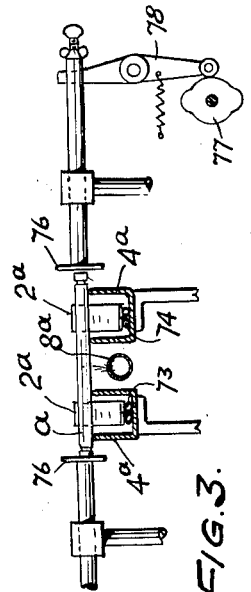
INVENTOR
Joseph Conde
BY
Augustus B Stoughton
ATTORNEY.

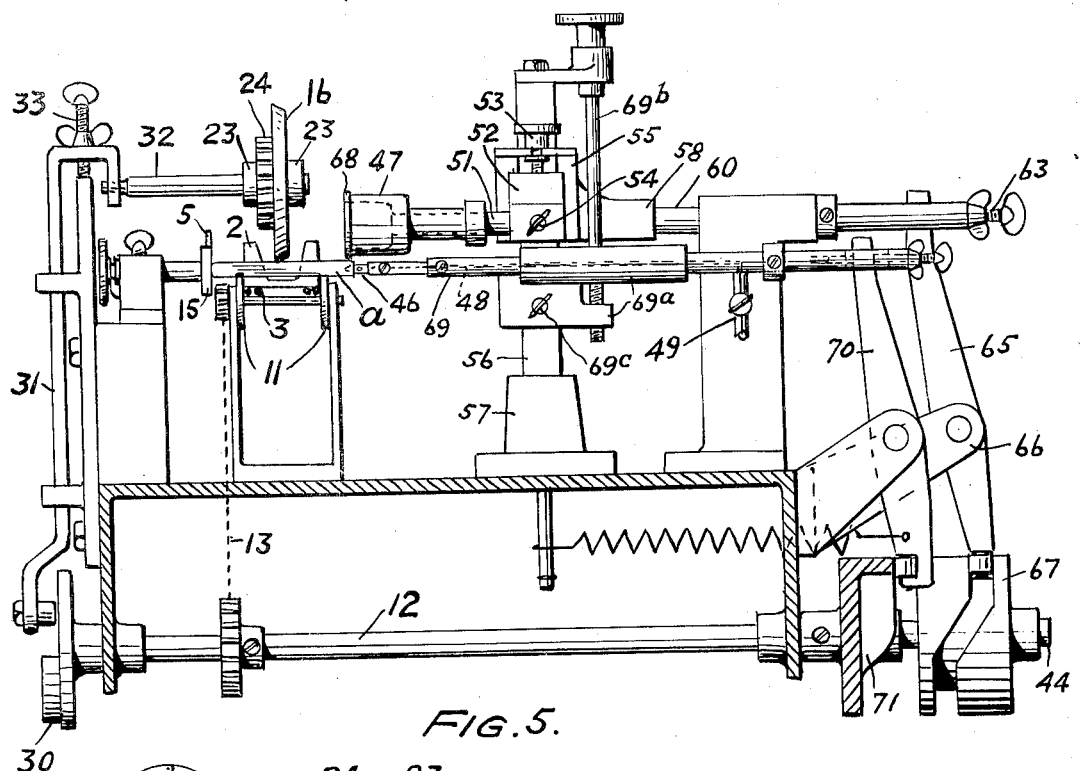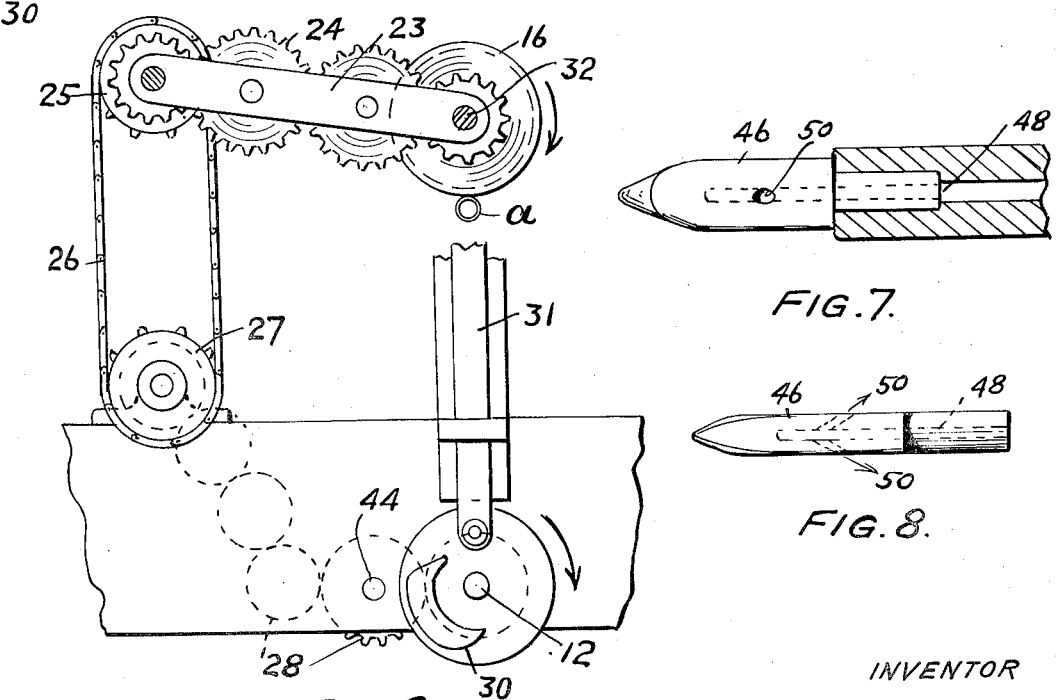

March 24, 1925.
J. CONDE
1,530,884
MACHINE FOR MAKING BOTTLES OR VIALS
Filed Aug. 29, 1921 4 Sheets-Sheet 3
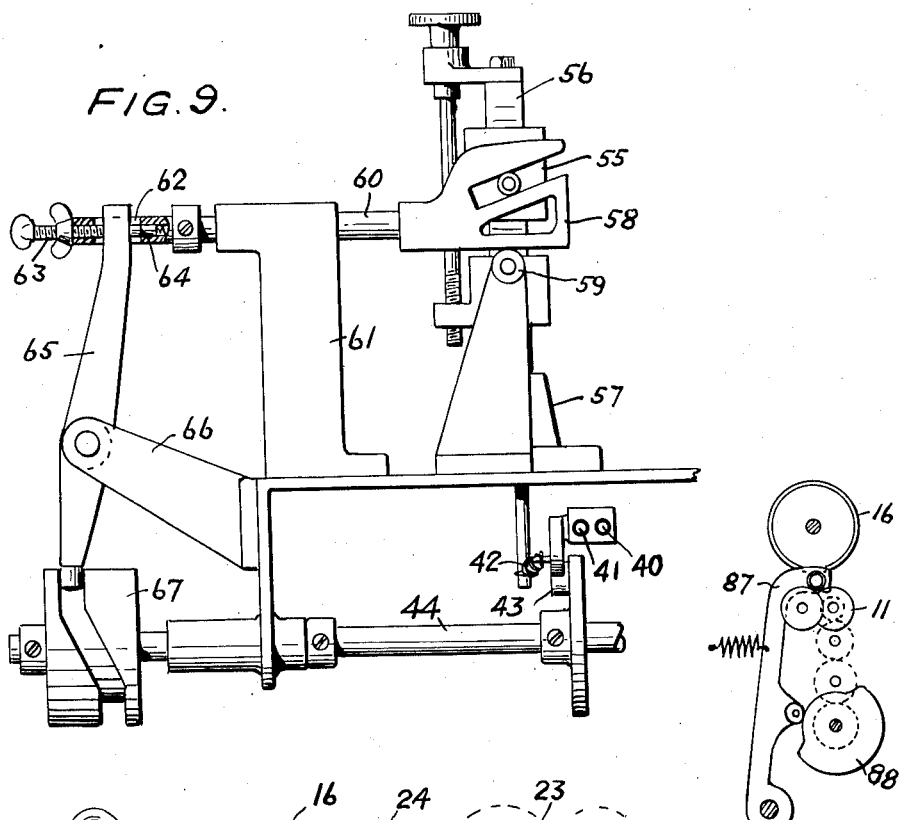
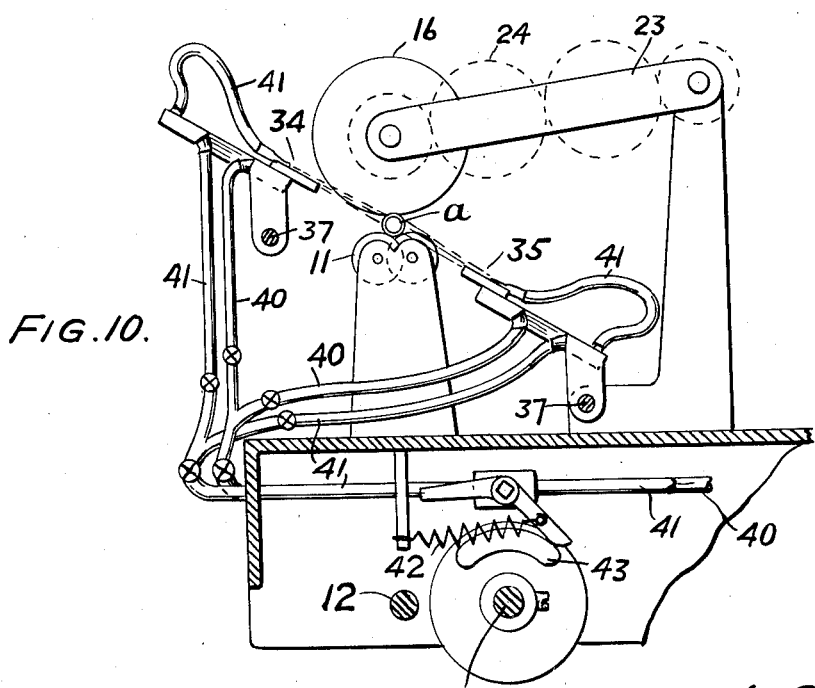
WITNESS:
Robt R Kitchel
INVENTOR
Joseph Conde
BY
Augustus B Stoughton
ATTORNEY.

March 24, 1925.                                                      1,530,884
J. CONDE
MACHINE FOR MAKING BOTTLES OR VIALS
Filed Aug. 29, 1921          4 Sheets-Sheet 4

WITNESS:
Rob. P. Kitchel.

INVENTOR
Joseph Conde
BY
Augustus B. Stoughton
ATTORNEY

Patented Mar. 24, 1925.

1,530,884

UNITED STATES PATENT OFFICE.

JOSEPH CONDE, OF VINELAND, NEW JERSEY; ISABELLA S. CONDE EXECUTRIX OF SAID JOSEPH CONDE, DECEASED, ASSIGNOR, BY MESNE ASSIGNMENTS, TO KIMBLE GLASS COMPANY, OF LANDIS TOWNSHIP, NEW JERSEY, A CORPORATION OF ILLINOIS.

MACHINE FOR MAKING BOTTLES OR VIALS.

Application filed August 29, 1921. Serial No. 496,193.

*To all whom it may concern:*

Be it known that I, JOSEPH CONDE, a citizen of the United States, residing at Vineland, in the county of Cumberland and State of New Jersey, have invented a new and useful Improvement in Machines for Making Bottles or Vials, of which the following is a specification.

My invention relates to a machine capable of automatically making glass bottles or vials and also adapted for making parts of the same so that the articles can be finished either by hand or upon some other machine.

The principal objects of the present invention are, first, to increase the production; second, to improve the quality of the product; third, to provide for variations in the shape or form of the product, more especially the neck part thereof; fourth, to improve the application of heat; fifth, to make the operation continuous; and sixth, to simplify and improve the construction, arrangement, operation and adjustment of the various parts.

Other objects of the invention will appear from the following description which will be made in connection with the embodiment of the invention chosen for illustration in the accompanying drawings forming part hereof and in which—

Figure 1 is a top or plan view of the machine highly diagrammatic or schematic in character and with parts omitted.

Fig. 2 is a side view or elevation similar in character to Figure 1.

Fig. 3 is a transverse sectional view taken on the line 3—3 of Figure 1 and drawn to an enlarged scale.

Fig. 4 is a sectional view taken on either of the lines 4—4 of Figure 1 but looking in the direction indicated by the arrows on those lines.

Fig. 5 is a transverse sectional view drawn to an enlarged scale and illustrating parts of the neck forming mechanism.

Fig. 6 is a side view, generally speaking, of the lefthand end of the appliance of Fig. 5.

Figs. 7 and 8 are enlarged plan and side views, the former being partly in section, of a plug shown at about the center of Fig. 5.

Fig. 9 is a rear elevational view of the parts shown at the righthand end of Fig. 5.

Fig. 10 is a side view, partly in section, illustrating a portion of the heating apparatus.

Fig. 17 is a view illustrative of mechanism for operating a movable abutment or former shown in Fig. 15.

Figures 11, 12:
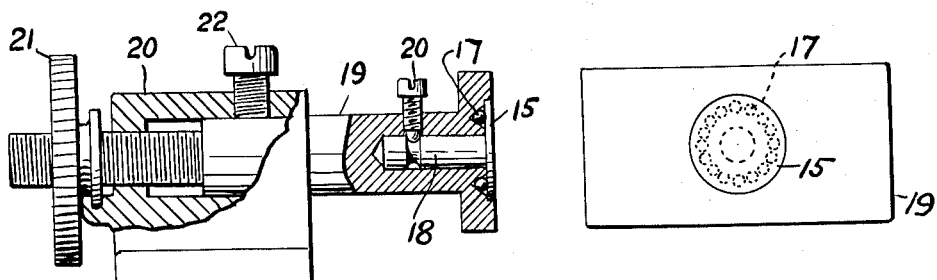
Fig. 11 is a sectional view showing a rotary abutment.
Fig. 12 is a front view of the same.
Figures 13, 16:
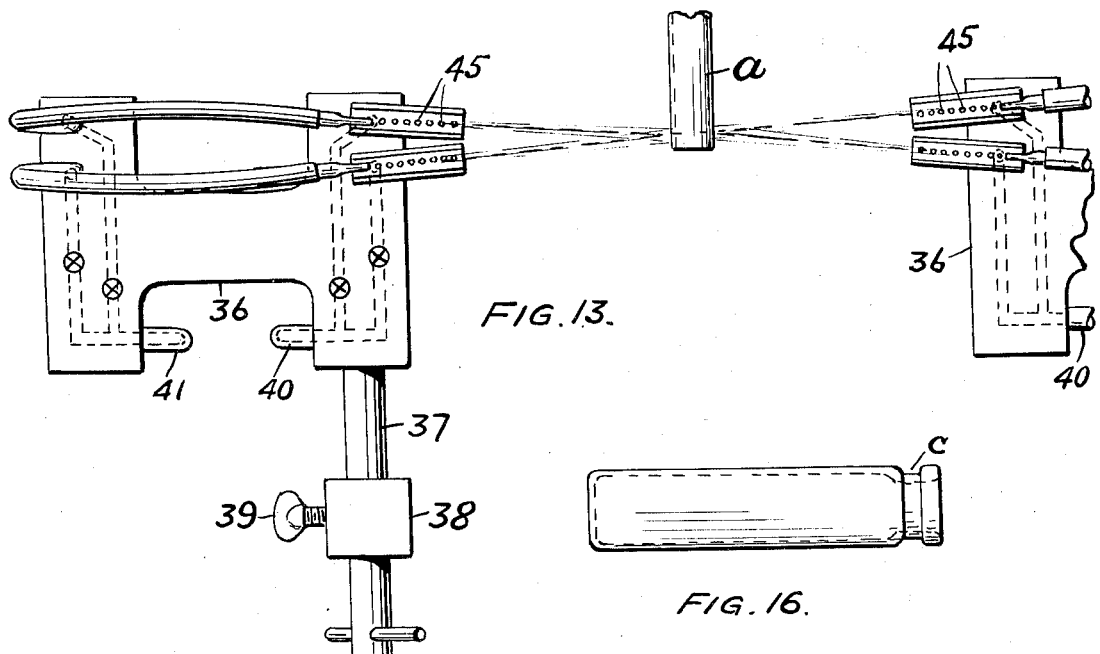
Fig. 13 is a top or plan view of the heating means shown in Fig. 10.
Fig. 16 is a view illustrating the finished product in one form.
Figure 14:
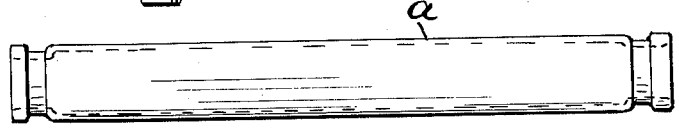
Figs. 14 and 15 are views showing different stages of the product in its manufacture.
Figure 15:
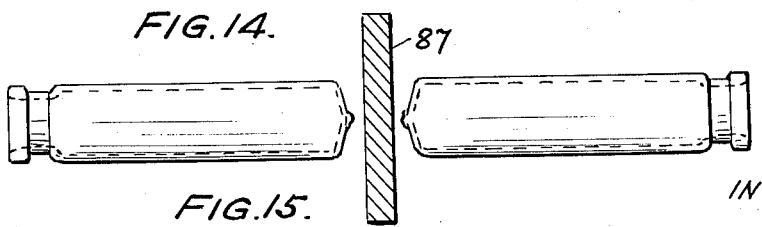

The raw material or stock consists of glass tubes *a* which may be cut in uniform lengths from longer glass tubes or tubing. The tubes *a* are fed as by means of a chute 1 singly between the fingers or flights 2 of a continuously driven endless conveyer 3. The conveyer fingers or flights 2 carry or roll the tube along rails 4, 4, Fig. 4, which are not level but are slightly higher one than the other in order to direct the lower end of the inclined tube into contact with the guide 5 adjustably mounted parallel to the rails by means of the set screws 6 in standards 7. By this arrangement the upper or free end of each tube *a*, that is the righthand end in Fig. 4, is properly positioned in respect to a pre-heating gas burner 8 that extends for a considerable distance along the path of the conveyer and is adjustably supported by means of set screws 9 from standards 10. In this way the end of the tube is pre-heated and the tube properly positioned as it approaches the neck forming mechanism indicated at *b* in Figs. 1 and 2. This mechanism *b* includes tube-supporting rollers 11 driven, for example, from some rotating shaft as 12, Fig. 5, through the intervention of gearing indicated in part by a center line 13 in Fig. 5. These rollers 11 are placed at a lower level than the main parts or top tube-supporting edges of the rails 4 which are equally inclined downward as at 14 so that upon reaching the inclines 14, each tube runs or rolls ahead of the finger or flight 2 which was previously driving it and dwells in rotation upon the rollers 11 until overtaken by its driving flight or finger. During this dwell of the tube its cool end is supported against the rotary abutment 15, Fig. 11, which is arranged in alignment with the guide bar 5, and the rotating conical rim of the wheel 16 comes into contact with the upper face of the tube and not only assists in rotating it but also holds it up to the abutment 15. Referring to Fig. 11 the abutment 15 runs on an end thrust ball bearing 17 and its shank 18 is turnably mounted in the holder 19 by a screw 20, the point of which is arranged in a groove on the shank. The holder 19 is adjustable in a bracket 20 by means of an adjusting nut 21 and a set screw 22. The wheel 16 may well be made of rubber and it is turnably mounted on the end of a swinging arm 23, Fig. 6, which carries the gearing 24 by which it is rotated. The gearing 24 is driven as by a sprocket wheel 25 concentric with the pivot of the swinging arm and driven by the chain 26 from the sprocket wheel 27 which is driven through a train of gears 28 from the shaft 12. Such shaft 12 is provided with a sliding cam 30 which by cam rod 31, Fig. 5, acting on a projection 32 from the arm 23, serves to lift it and the wheel 16 and to permit the latter to descend within the limit set by the adjustable stop screw 33. During the dwell of the tube on the rollers 11, which has been above referred to, its preheated end is further heated by the flames from opposed burners 34 and 35, Figs. 10 and 13, arranged in pairs and operating at an inclination to the horizontal. Each pair of burners is carried by a head 36, and a rod 37 projecting from the burner head is endwise movable and turnable in a bracket 38 which is provided with a clamping screw 39 so that the burners can be easily and accurately adjusted. 40 are valved gas connections for the burners and 41 are valved air connections for the burners. The gas and air connections are controlled by a valve operated in one direction by a spring 42 and in the other direction by a cam 43 mounted on the driven shaft 44. Gas is delivered through the apertures 45 and air is blown over these apertures. From the foregoing description it is evident that the flames from the burners 34 and 35 are caused to automatically play upon the end of the tube for the proper length of time and at appropriate intervals by the operation of the cam 43. The heat of these flames smooths or glazes the end of the tube and makes it susceptible of the neck forming operation. The plug 46 and the rotating neck former 47 are brought into action upon the revolving tube during its dwell on the rollers 11. The plug 46, Fig. 7, has through it a passage 48 to which air for cooling the plug is supplied by the connection 49, Fig. 5, and from which the air is discharged at 50. The former 47 is rotatably mounted on the shaft 51 as by means of annular ball bearings which are not shown because they are internally arranged. The shaft 51 projects from a block 52 with which it is connected for endwise adjustment by a set screw 54, and this block 52 is adjustably connected by an adjusting screw 53 with a sliding head 55, Fig. 9, arranged to slide vertically on a bar 56, carried by a bracket or post 57. 58, Fig. 9, is a cam slidable on a roller 59 carried by the bracket 57 and having its actuating rod 60 slidable in a bracket 61 and provided with a slot 62 having through one of its walls an adjusting screw 63 and through the other of its walls a spring plunger 64. The follower or rock arm 65 pivoted to the bracket 66 co-acts with the cam 67 on the shaft 44 and works or slides the cam 58 and so raises and lowers the rotary former 47 and the spring plunger 64 insures proper action of the stop collar 101 in respect to the face of the part 61 and with respect to wear of the parts. By the described mechanism the rotary former 47 rolling in contact with the heated end of the tube forms the neck groove thereon. The former shown is provided with a flange 68 and it therefore forms a groove c, Fig. 16, but the shape of the former can be varied to provide bottle necks of different kinds including threaded necks. The plug holder 69 is slidably mounted for endwise movement in a head 69$^a$ adjustable up and down on the bracket 56 by means of an adjusting screw 69$^b$ and a set screw 69$^c$, and the plug holder 69 is operated by the follower or rock arm 70 of the cam 71 on the shaft 12 through the intervention of a spring plunger and an adjusting screw like the spring plunger 64 and the adjusting screw 63 shown in Fig. 9 and above described, but the purpose is to cushion the action of the face of the plug. Through the described mechanism the plug is inserted into the end of the tube before the former 47 comes down, and then the plug is advanced slightly to permit its shoulder 102 to finish and square up the end of the vial or bottle, thus completing the neck forming operation. Upon completion of the necking operation and by reason of the continuity of travel of the conveyor 3 the conveyor flight or finger 2 catches up to the tube upon which the neck has been formed and which has been released by the roller 16 and carries the tube up the incline to the next reach of the rails 4 which is substantially like the reach of the rails 4 that has been described except that the guide 5 is on the other side and the rails are out of level so as to incline toward the guide. The end of the tube which has not been necked is then pre-heated and the tube carried forward to the apparatus at $b^1$ which is a duplicate of the apparatus at $b$ but faced the other way around and therefore it need not be described further than to say that by means of it the other end of the tube is necked in the manner described so that the tube at this stage is fairly represented by the illustration of Fig. 14. After leaving the mechanism at $b^1$ the tube with a neck formed on each end travels down the chute 72 and is delivered to a pair of continuously driven conveyers 73 and 74, Fig. 3, spaced apart and having fingers $2^a$ and rails $4^a$ substantially of the construction already described but not necessarily arranged at different levels. Between these conveyers a pre-heating burner $8^a$ is positioned and also a jet burner $x$ such as shown in Figs. 10 and 13, which latter is arranged in rear of the pre-heating burner and at the declivity $d$ in the rails and in line with the two pairs of driven rolls 75 upon which the tube while in rotation dwells until overtaken by a finger or flight of the conveyers 73 and 74. In this position the tube is in line with abutments 76 which may be substantially as shown in Fig. 11 but which are arranged to be moved toward and away from each other, for example, by means of positively driven double throw cams of which one 77 with its spring pressed follower 78 is shown in Fig. 3. A pair of beveled rolls $16^a$, Figure 1, substantially the same as the roller 16 and having driving gear as illustrated in Figs. 5 and 6, descend upon the rotating tube, the middle of which has been pre-heated and also subjected to jet heating, and these rolls $16^a$ draw the tube apart in such a way that the end of each part is closed, it being understood that while this is going on the abutments 76 are retracted. Thereupon the abutments 76 approach each other so that the sealed ends of the two parts of the tube are re-heated. Then the abutments 76 are retracted and the bottom former 87 is permitted by the cam 88, Fig. 17, to swing between the bottoms of the two sections of the tube, Fig. 15, and the abutments 76 push the closed ends or bottoms of the sections of the tube against the opposite faces of former 87 and so the bottoms of the vials or bottles are finished. The flight of the conveyer which has been constantly moving overtakes the finished vials and carries them forward to the delivery chute 79. While in the foregoing description reference has been made to the operations that are performed upon a single tube or piece of stock, it will of course be understood that these operations are performed upon several pieces of tube or stock at the same time and that the conveyers are in continuous operation so that the machine may be said to perform continuously.

It will be obvious to those skilled in the art to which the invention relates that modifications may be made in details of the construction and arrangement of parts without departing from the spirit of the invention which is not limited as to those matters or otherwise than as the prior art and the appended claims may require.

I claim:

1. In a machine of the character described, the combination of supporting means for sustaining a glass blank while being operated upon, glass-working mechanism positioned to act on the blank while the latter is supported by said means, a blank conveying means, means to actuate said conveying means continuously, and means to cause the blank to travel ahead of the conveying means and to dwell temporarily on said supporting means during the action thereon of said glass-working mechanism whereupon the conveying means having caught up with the blank transports it onwardly from said supporting means.

2. In a machine of the character described, the combination of a supporting trackway having a declivity, blank supporting means in register with said declivity, glass-working mechanism positioned to act on the blank while the latter is supported by said means, an endless conveyer for feeding the blank along said trackway with the blank supported on the latter, and means to operate said conveyer continuously, whereby the blank upon reaching the declivity descends the latter ahead of the conveyer and temporarily dwells on said supporting means during the action thereon of said glass-working mechanism whereupon the conveyer having caught up with the blank transports it onwardly from said supporting means.

3. In a machine of the character described, the combination of a supporting trackway having a declivity, blank supporting means in register with said declivity, means to heat the blank while on said supporting means, means to rotate the blank while on said supporting means, glass-working mechanism positioned to act on the blank while the latter is supported by said means, an endless conveyer for feeding the blank along said trackway with the blank supported on the latter, and means to operate said conveyer continuously, whereby the blank upon reaching the declivity descends the latter ahead of the conveyer and temporarily dwells on said supporting means during the action thereon of said glass-working mechanism whereupon the conveyer having caught up with the blank transports it onwardly from said supporting means.

4. In a machine of the character described, the combination of a blank-supporting trackway having a declivity, blank-supporting rollers in register with said declivity, means to rotate the blank while it is on said rollers, means to heat the blank while it is on said rollers, a glass-working tool adapted to act on the heated blank on said rollers, a conveyer having spaced feeding fingers by which the work is fed along said trackway to and beyond said rollers, and means to operate said conveyer continuously, whereby the blank is adapted to travel down said declivity ahead of the conveyer finger on to said rollers and to be operated upon by said glass-working tool before said finger catches up with the blank and transports it away from the rollers.

JOSEPH CONDE.